Patented Mar. 27, 1928.

1,663,913

UNITED STATES PATENT OFFICE.

HENRI LEROUDIER, OF LYON-VILLEURBANNE, FRANCE.

PROCESS FOR THE MANUFACTURE OF OLEOMARGARINE.

No Drawing. Application filed May 7, 1926, Serial No. 107,490, and in France May 20, 1925.

It is a known fact that oleomargarine is manufactured by cold or by the settling in the mass, after superfusion, of a general emulsion of animal and vegetable oils or fats and of water or aqueous liquid, churned together, the aqueous liquid being always in less amount than the total amount of oils and fats.

Processes exist in which natural or artificial milk is utilized as an aqueous liquid for the manufacture of oleomargarine but the price of the oleomargarine thus obtained is rather high and the object of the present invention is to overcome this disadvantage by eliminating the milk.

It has already been proposed to add to the margarine fats, an aqueous solution containing an emulsion obtained by extracting as with water or almond milk, cocoanuts, almonds or the like which still contain the fats.

In the present invention the emulsion is not utilized and the aqueous liquid contains a larger proportion of fats.

The present invention has for its object a process for the manufacture of oleomargarine which consists in adding to the principal mass of the oleomargarine i. e. to the fatty substances either pure or already emulsified with a small amount of water (for instance 5 per cent water) an emulsion of fats or fatty matter suspended in a great quantity of water which are more fluid than the said principal mass. This latter emulsion is characterized by a larger proportion of water than of fats.

This addition may attain, at the maximum, 25 per cent of the principal mass, and is made either during the churning or after the oleomargarine has formed into a mass. In the latter case, it takes place in the mixing vessel, as in the case of two different oleomargarines, or even in the roller crusher, by adding it drop by drop during the crushing operation.

I will indicate below an example of realization of the process, the object of the invention.

To an emulsion consisting of 40 kgs. water, 600 kgs. of first-pressed beef juice, and 450 kgs. of cocoa oil which are already contained in the churning apparatus, there is added during the churning an emulsion of 15 kgs. of peanut oil, 10 kgs. cocoa oil and 80 kgs. water. The churning is continued for about five minutes, and the solidification takes place either by a sudden cooling or by a super-fusion by prolonging the churning action. It should be remarked that the present invention further relates to the manufacture of oleomargarine from skimmed milk which is reconstituted by emulsifying it with oils and greases which replace the removed fatty matter.

But the invention is characterized by the use, in the manufacture of the oleomargarine, of emulsions of water with a small amount of oil and grease without the use of milk properly so called.

Microscopic examination of the oleomargarine which is obtained according to my said process, shows that it contains globules of different sizes, all of which are found in equal or nearly equal proportions, whilst the usual oleomargarines contain globules having only two or three different sizes and in unequal proportions.

An oleomargarine can thus be manufactured without fermentible products by the use of vegetable fats exclusive of animal fats, which affords a preservation of the product for two or three months and a small cost price due to the elimination of the milk and like expensive products.

It is obvious that modifications may be made in the method of realization above disclosed, without departing from the spirit of the invention.

What I claim is:

1. A process for the manufacture of oleomargarine, which consists in adding to the principal mass of the oleomargarine and the melted fats and oils, an intimate mixture consisting only of fats and oils suspended in a great quantity of water which is more fluid than the said principal mass of the oleomargarine.

2. A process for the manufacture of oleomargarine, which consists in adding to the principal mass of the oleomargarine and the melted fats and oils containing but a very small quantity of emulsified water, an intimate mixture consisting only of fats and oils suspended in a great quantity of water which is more fluid than the said principal mass of the oleomargarine.

3. A process for the manufacture of oleomargarine, which consists in adding to the principal mass of the oleomargarine and the pure melted fats and oils, an intimate mixture consisting only of fats and oils suspended in a great quantity of water which is more fluid than the said principal mass of the oleomargarine.

In testimony that I claim the foregoing as my invention, I have signed my name hereto.

HENRI LEROUDIER.